(12) United States Patent
Lugo

(10) Patent No.: US 8,636,447 B1
(45) Date of Patent: Jan. 28, 2014

(54) SYSTEM AND METHOD FOR REPAIRING AND EXTENDED LENGTH OF A SUBSEA PIPELINE

(75) Inventor: Mario R. Lugo, Houston, TX (US)

(73) Assignee: Trendsetter Engineering, Inc., Houston, TX (US)

( * ) Notice: Subject to any disclaimer, the term of this patent is extended or adjusted under 35 U.S.C. 154(b) by 0 days.

(21) Appl. No.: 13/550,068

(22) Filed: Jul. 16, 2012

Related U.S. Application Data

(62) Division of application No. 12/871,253, filed on Aug. 30, 2010.

(51) Int. Cl.
*F16L 55/18* (2006.01)

(52) U.S. Cl.
USPC .................... 405/184.1; 405/158; 405/172

(58) Field of Classification Search
USPC .................... 405/158, 168, 172, 184.1
See application file for complete search history.

(56) References Cited

U.S. PATENT DOCUMENTS

| | | | | |
|---|---|---|---|---|
| 4,310,263 | A * | 1/1982 | Daughtry | 405/169 |
| 7,600,569 | B2 * | 10/2009 | Routeau et al. | 166/344 |
| 8,057,126 | B2 * | 11/2011 | Mogedal et al. | 405/170 |
| 2005/0141967 | A1 * | 6/2005 | Giles et al. | 405/158 |
| 2005/0196243 | A1 * | 9/2005 | Pollock et al. | 405/224.3 |
| 2005/0271476 | A1 * | 12/2005 | Chiesa et al. | 405/172 |
| 2006/0153639 | A1 * | 7/2006 | Pollack et al. | 405/170 |
| 2008/0205990 | A1 * | 8/2008 | Bird | 405/184.1 |
| 2008/0286050 | A1 * | 11/2008 | DeLack | 405/172 |

* cited by examiner

*Primary Examiner* — Benjamin Fiorello
(74) *Attorney, Agent, or Firm* — Egbert Law Offices, PLLC

(57) ABSTRACT

An apparatus from repairing a subsea pipeline has a pile with a receptacle on a top surface thereof, a frame having a pair of pins extending outwardly on opposite side of the frame and received within the receptacle of the pile, a length of pipeline affixed to the frame. The pipe support is affixed to an end portion of the length of pipeline. The receptacle has a pair of slotted members extending upwardly from a top surface of the pile. Each of the slotted members has a tapered opening with a hole formed below and communicating with the tapered opening.

7 Claims, 6 Drawing Sheets

SYSTEM AND METHOD FOR REPAIRING AND EXTENDED LENGTH OF A SUBSEA PIPELINE

CROSS-REFERENCE TO RELATED APPLICATIONS

The present invention claims divisional priority from application Ser. No. 12/871,253, filed on Aug. 30, 2010, entitled System And Method For Repairing And Extended Length Of A Subsea Pipeline", presently pending.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to apparatus and methods for repairing damaged subsea pipelines. More particularly, the present invention relates to methods and apparatus for repairing damaged sections of subsea pipeline through the use of a remotely-operated vehicle (ROV). It is still a further object of present invention to provide a method and apparatus for repairing a damaged section of a subsea pipeline in which a jumper line can be connected between the subsea pipeline in the space in which an extended length of a damaged section is removed.

2. Description of Related Art Including Information Disclosed Under 37 CFR 1.97 and 37 CFR 1.98.

Thousand of miles of pipeline lay on the seabed. Modern pipe laying technology permits the installation of pipelines in a variety of water depths, including water depths of thousands of feet. A serious problem results when damage occurs to a pipeline set in deep water because repair can become cumbersome and difficult. Typically, submerged pipelines are damaged by an object impacting the pipeline, by an anchor dragging across the pipeline, or by the environment corroding the pipeline. If a section of pipeline becomes significantly damaged, it can require replacement.

In the past, generally two methods were employed to repair a damaged submerged pipeline. One method required the damaged section of the pipeline to be recovered to the water surface for repair on the dock of a large service vessel. After the repair was completed, the pipeline was lowered and repositioned on the seabed. A disadvantage of this method was the expense associated with recovering the pipeline to the surface. Another disadvantage with this method was that it typically could only be used with small diameter pipelines in relatively shallow water.

A second method for repairing a damage pipeline involved cutting the pipeline into two pieces near the damaged section while the pipeline remained on the seabed. The cut end of each pipe section was pulled to the surface. Once at the surface, the damaged section of pipeline was replaced with a new section. Specially designed connectors gripped the pipe at the cut ends and provided a flange or collet hub that could be used to connect the new section to the pipeline. Often, a third connector was used to make a telescopic spool section that could be expanded between the two cut ends of the pipeline to facilitate the connection. A disadvantage of this method was that the product could escape from the pipeline to the subsea environment and seawater could enter into the pipeline.

To prevent product from escaping into the environment from the cut pipeline, hot tapping systems were used to plug the pipeline. In general, hot tapping systems use a clamp-on, split tee to provide a fluid tight connection in the pipeline. A special drill was attached to the tee in a manner that prevents loss of pipeline fluid during the tapping operation. The tapping drill was fitted with a special cutter that opened a hole in the side of the pipeline. After cutting a hole in the pipeline, a stopper machine replaced the drill. The stopper machine installed an elastomeric stopper into the pipeline. After the new pipeline section was attached to the remaining pipeline, the stopper was removed but the tee became a permanent part of the pipeline.

It is known to use a remotely operated vehicle (ROV) in deep water to sever and recover a submerged pipeline. U.S. Pat. No. 5,044,827, to Gray et al., discloses a method for severing and recovering a submerged pipeline. The ROV jets beneath a portion of the pipeline and then a deflated lift bag is lowered to the submerged pipeline. The deflated lift bag is positioned under the submerged pipeline and then inflated until a section of the pipeline has been raised off the seabed. A cut-off saw is lowered to the raised section of the pipeline. The cut-off saw is clamped to the pipeline prior to severing the pipeline. The cut-off saw is then removed from the severed pipeline. A recovery head is lowered to the raised end of the severed pipeline and, after alignment, is placed in the raised end of the severed pipeline. The recovery head is activated to establish a gripping relationship with the pipeline. A recovery cable is lowered and connected to the recovery head. The recovery cable is retrieved to recover the recovery head and the pipeline to the water surface.

It becomes increasing difficult to repair a subsea pipeline when the section of damaged pipeline is extremely long. Under certain circumstances, a section of pipeline of greater than 150 feet will require replacement and repair. As such, the prior art techniques for repairing damage subsea pipelines become ineffective. Fundamentally, it is quite difficult to extend a very long section of pipeline during repair activities. It is further very difficult to connect the ends of replacement pipeline in the subsea environment. As such, a need has developed so as to be able to replace a long length of damaged section of subsea pipeline with another pipe in a conventient, effective, and easy-to-install manner.

In the past, various patents have issued relating to the repair of subsea pipelines. For example, an early patent was U.S. Pat. No. 3,508,410, issued on Apr. 28, 1970 to R. P. Lynch. This patent describes a submerged pipeline repair system in which an underwater repair chamber is adapted to straddle the submerged pipeline. Supply lines are provided for introducing a pressurized gas to displace any water therein and maintain the supply lines in a dry condition. Separate clamping mechanisms, such as pressure-actuated cylinders and piston, are located externally of the chamber and mounted at each end of a rigid support structure for engaging the pipeline on opposite sides of the chamber to prevent any movement of the pipeline.

U.S. Pat. No. 5,425,599, issued on Jun. 20, 1995 to Hall et al., also shows a method for repairing a submerged pipeline. This method includes the steps of lowering pipe support frames to the seabed and positioning the pipe support frames beneath the subsea pipeline on each side of the damaged pipeline section. The pipe support frames are expanded to elevate the damaged pipeline section. A pair of pipe attachment and receiving assemblies are lowered to the seabed and positioned astride the pipeline on each side of the damaged section of the pipeline. The pipeline is then gripped. Cutting modules are lowered and attached to the pipe attachment and receiving assemblies. The pipeline is cut at each location. A telescoping spool section is lowered to the seabed and docked into the docking modules. The telescoping spool section is expanded until the spool section engages the pipeline ends.

U.S. Pat. No. 5,458,441, issued on Oct. 17, 1995 to D. W. Barry, shows a pipe section for installation into a subsea pipeline. The pipe section provides a length of pipe having a pipe wall and at least a first bearing shoulder projecting circumferentially outward from the pipe wall so that the pipe section can be handled by supporting the pipe section from the first bearing shoulder during installation. The first bearing shoulder also prevents propagation of buckling failure in the subsea pipeline.

U.S. Pat. No. 5,518,341, issued on May 21, 1996 to Hall et al., teaches a pipe support framemov for positioning a subsea pipeline. The support frame includes upper and lower skids which are maintained in vertical alignment with one another. The lower skid includes vertical skid members and the upper skid includes matting vertical upper skid members which slidably engage the vertical lower skid members and maintain vertical alignment. Water jacking bags are positioned between the upper and lower skids to alter the elevation of the upper skid. The upper skid includes a pair of parallel beams. A trolley assembly is movably mounted to the pair of parallel beams to adjust the lateral position of the pipeline. A saddle receives the pipeline and is attached the trolley assembly. A threaded drive rod is rotatably mounted between the pair of parallel beams. The threaded drive rod is threadedly engaged with the trolley assembly such that the lateral position of the trolley assembly is controllable by manipulating the threaded drive rod.

U.S. Pat. No. 6,241,424, issued on Jun. 5, 2001 to Bath et al., provides a method and apparatus for repairing submerged pipeline. This method comprises installing a pair of hot tap tees on either side of the damaged section of pipeline, cutting a hole in the pipeline through each hot tap tee, inserting and securing plugging pigs into the pipeline, cutting and removing the damaged section of pipeline, and installing a new section of pipeline. The apparatus includes a plugging pig for use during repair of a damaged pipeline. This plugging pig has a body shaft, a cup seal secured to the body shaft for engaging an interior wall of the pipeline, a cam attached to the exterior of the body shaft, a slip assembly for sliding on the cam and engaging a slip against the pipeline wall, and a control mechanism for engaging and releasing the slip from the wall.

U.S. Patent Publication No. 2010/0047023, filed on Mar. 7, 2007, describes a pipeline repair connector for a subsea pipeline system. The connector includes a connector housing for gripping and sealing the pipeline ends, and an inlet funnel for receipt of at least one of the pipeline ends. The first part of the housing includes a pressurized gripping and sealing arrangement for receipt and gripping of an existing pipeline end in the connector housing. There is a second part of the housing that has a pressurized operated lightweight coupling for receipt and gripping of a replacement pipe in the connector housing. A pressurized alignment ball joint is intermediate between the housing and the ends. All of the components are adapted to be hydraulically pressurized in a mechanically locking position and to provide a seal to the surroundings.

It is an object of the present invention to provide a method and apparatus for repairing a damaged section of subsea pipeline that effectively establishes a fluid pathway in place of the damaged section of pipeline.

It is another object of the present invention to provide a method and apparatus for repairing a damaged section of subsea pipeline which can be carried out by an ROV in a deepwater environment.

It is still another object of the present invention to provide a method and apparatus for repairing a damaged section of subsea pipeline which can be quickly and easily installed.

It is a further object of the present invention to provide a method and apparatus for repairing a damaged section of subsea pipeline that effectively prevents leakage of pipeline fluid during the repair procedures.

It is still another object of the present invention to provide a method and system for repairing a damage subsea pipeline which allows replacement sections of greater than 150 feet to be easily installed.

These and other objects and advantages of the present invention will become apparent from a reading of the attached specification and appended claims.

BRIEF SUMMARY OF THE INVENTION

The present invention is a method of repairing a subsea pipeline that comprises the steps of: (1) positioning a pile onto a subsea floor in a location adjacent to the subsea pipeline; (2) cutting a section of pipeline from the subsea pipeline so that the subsea pipeline has a first cut end and a second cut end; (3) moving a length of pipeline to the pile so as to hingedly connect the length of pipeline with a receptacle on the pile; (4) pivoting the length of pipeline about the hinged connection so as to move the length of pipeline from a generally vertical orientation to a generally horizontal orientation; (5) connecting the first end of the length of pipeline to the first cut end; and (6) connecting the second end of the length of pipeline to the second cut end.

The step of connecting the first end includes the steps of affixing one end of a jumper to the first end of the length of pipeline and affixing another end of the jumper to the second cut end. The first end of the length of pipeline extends vertically upwardly when the length of pipeline is in a generally horizontal orientation. The step of affixing one end includes lowering the jumper such that one end of the jumper overlies a portion of the first end of the length of pipeline. A frame is affixed to the first end of the length of pipeline prior to the step of moving. The frame has a pair of pins extending therefrom. The receptacle includes a pair of slotted members extending upwardly from a top of the pile. The pair of pins of the frame are stabbed respectively into the pair of slotted members such that the pair of pins is rotatably received into the pair of the slotted members. The step of pivoting includes pivoting the frame about the receptacle from a position extending vertically upwardly to a position in which the frame is horizontally positioned upon a top surface of the pile.

In the present invention, the step of positioning includes driving the pile into the subsea floor for a distance such that a top of the pile extends above the subsea floor for a distance. The step of connecting the second end of the length of pipeline includes affixing one end of a jumper to the second end of the length of pipeline and affixing an opposite end of the jumper to the second cut end of the subsea pipeline. In the present invention, the subsea pipeline is lifted for a desired distance above the subsea floor prior to the step of cutting. The first cut end of the subsea pipeline can be closed with a first stopper. The second cut end of the subsea pipeline can be closed with a second stopper.

The present invention is also an apparatus for repairing a subsea pipeline. This apparatus includes a pile having a receptacle on an upper surface thereof, a frame pivotally connected to the receptacle of the pile, and a length of pipeline affixed to the frame. The receptacle includes a pair of slotted members. The frame has a pair of pins extending therefrom. The pair of pins are respectively received in the pair of slotted members. Each of the pair of slotted members has a tapered opening with a wide end at a top of the slotted member and a narrow end downwardly therefrom. The tapered opening communicates with a hole formed below the narrow end.

In the present invention, the frame is movable between a horizontal position and a vertical position. The length of pipeline has a first end portion and a second end portion. The first end portion extends vertically upwardly when the frame is in the horizontal position. The length of pipeline extends horizontally from the first end portion when the frame is in the horizontal position. A jumper has one end affixed to the first end portion of the length of pipeline and extends outwardly therefrom. The jumper has another end suitable for connection to the subsea pipeline. The length of pipeline extends vertically upwardly of the pile when the frame is in the vertical position. This length of pipeline has a first end portion secured to the frame and a second end portion extending away from the pile. The second end portion extends vertically upwardly when the frame is in the horizontal position. A jumper is affixed to the second end portion and extends therefrom. This jumper is suitable for connection to the subsea pipeline. A pipe support frame is affixed to the second end portion of the length of pipeline. The pipe support frame has a bottom plate suitable for supporting the second end portion a desired distance above the subsea floor.

DETAILED DESCRIPTION OF THE INVENTION

Figure 1:
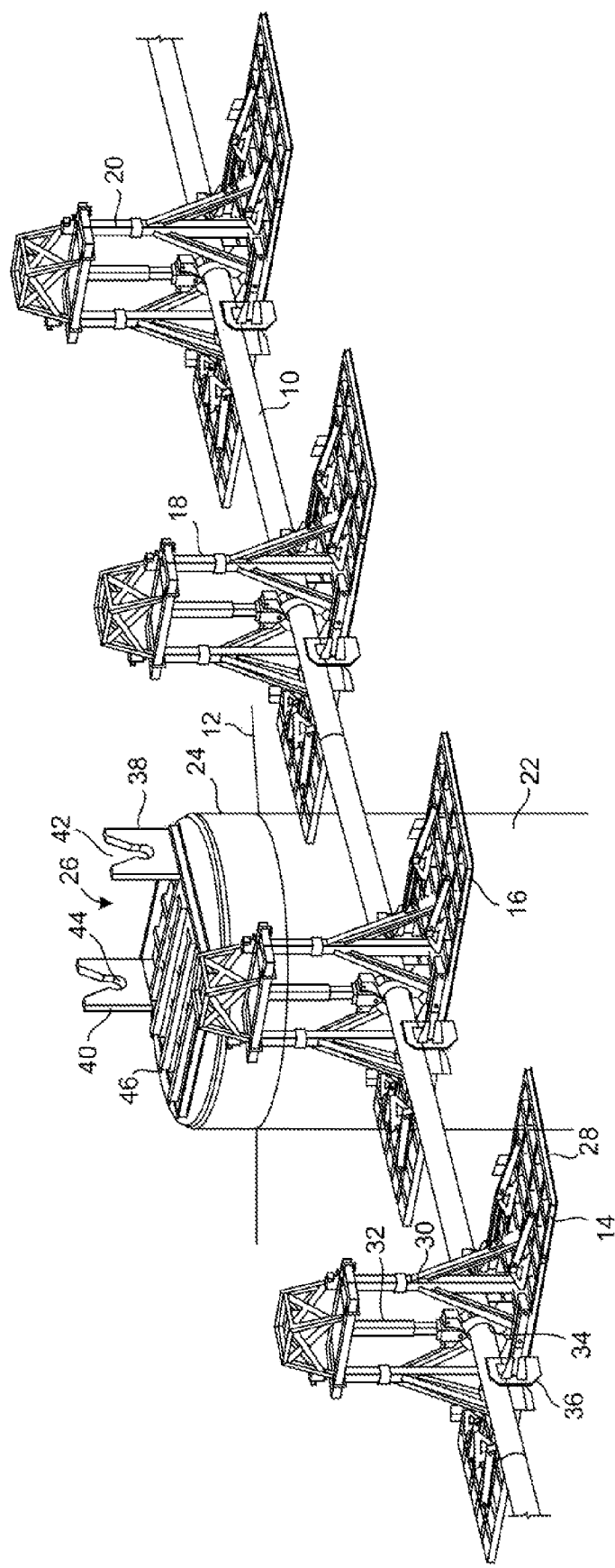
FIG. 1 is a perspective view of an initial step in the repair of a damage subsea pipeline.

Referring to FIG. 1, there is shown the initial step in the process of the present invention for the repair of subsea pipeline 10. It can be seen that the subsea pipeline 10 is positioned above sea floor 12. A plurality of pipe lifting assemblies 14, 16, 18 and 20 are employed for the purposes of lifting the pipeline a desired distance above the sea floor 12. A pile 22 is driven into the sea floor 12 for a desired distance such that a portion 44 extends upwardly above the sea floor. The top of the pile 22 includes a receptacle 26 thereon.

In FIG. 1, the subsea pipeline 10 has a damaged section that extends over a substantial length. In the preferred embodiment of the present invention, the damaged section of the pipeline 10 will extend for a length of 150 feet or more. As such, it is necessary to substitute an extended length of pipeline in the place of the damaged section. This can be achieved by the process of the present invention.

Each of the pipe lifting assemblies 14, 16, 18 and 20 has a similar configuration. With reference to pipe lifting assembly 14, it can be seen that there is a base plate 28 that resides upon a seafloor 12. The base plate 28 has a central area through which the pipeline 10 can pass. A frame 30 extends upwardly from the base plate so as to support a hydraulic actuator 32 in a suitable position about the pipeline 10. A clamp 34 extends around at least a portion of the outer diameter of the subsea pipeline 10. When the actuator 32 moves the clamp 34 downwardly, it will grasp the subsea pipeline 10. The hydraulic actuator 32 can be activated so as to move upwardly so as to lift the subsea pipeline 10 a desired distance above the sea floor 12. Suitable guide shoes 36 are provided on the base plate 28 so as to assure that the pipe lifting assembly 14 is positioned in a proper position relative to the pipeline 10 and that the pipeline is positioned directly under the actuator 32 and the clamp 34. Each of the pipe lifting assemblies 14, 16, 18 and 20 reside in spaced relationship along the pipeline 10.

Once the pipeline 10 is in an elevated position above the seafloor 12, an ROV can be utilized so as to saw the damaged section from the remainder of the subsea pipeline 10. The pipe lifting assemblies 14, 16, 18 and 20 can then be used to maintain the pipeline 10 in an elevated position so that the proper connections can be made between the replacement length of the pipeline and the remainder of the pipeline 10.

In FIG. 1, it can be seen that the pile 22 has a generally cylindrical configuration. The pile 22 can be driven into the sea floor 12 by a variety of mechanisms that are known in the prior art. Importantly, the top of the pile 22 extends above the seafloor 12 for a small distance. A pair of slotted members 38 and 40 extend upwardly from the upper surface of the pile 22. Each of the slotted members 38 and 40 has a generally tapered opening 42. The tapered opening 42 has a wide opening at the top of that slotted member 38 and a narrow end away from the top of the slotted members 38. A hole 44 is located below the narrow end. As will be described hereinafter, the hole 44 will serve to receive a pin member associated with a pipeline-containing frame. The slotted members 40 and 42 can be affixed to a panel 46 that is adhered to or otherwise affixed to the top surface of the pile 22.

In FIG. 1, that the pile 22 is positioned adjacent to the subsea pipeline 10. Importantly, within the concept of the present invention, it is not critical that the pile 22 be placed in alignment with the subsea pipeline. The various components of the present invention allow the pile 22 to be offset from the subsea pipeline. As such, precise accuracy in the installation of the pile 22 is not required by the present invention.

Figure 2:
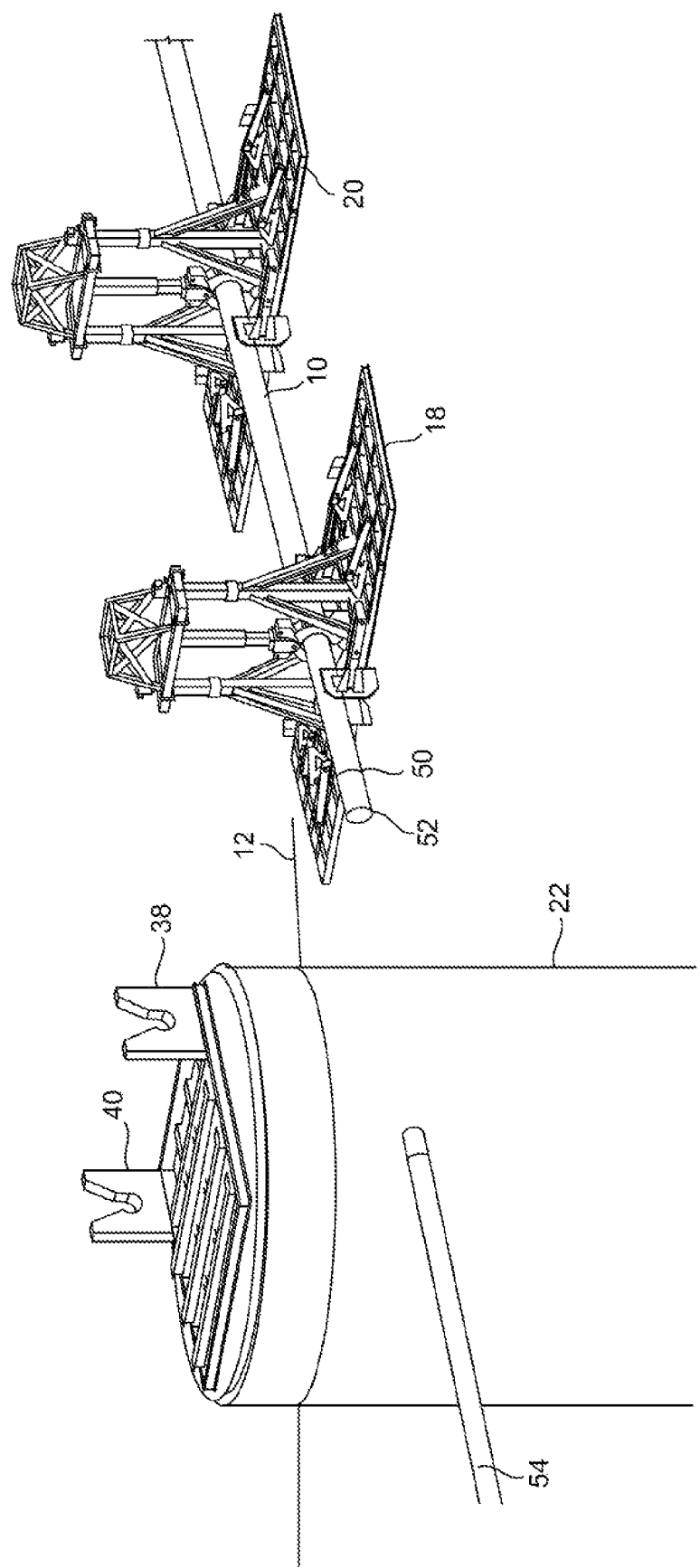
FIG. 2 is a subsequent step in the process of repairing a damage subsea pipeline.

FIG. 2 shows that the subsea pipeline 10 has been cut at end 50. An ROV-supported saw mechanism can be utilized so as to carry out the cutting of the cut end 50. A hydraulic stopper 52 is placed into the cut end 50 to avoid any seepage of the contents of the pipeline 10 into the outside environment. The stopper 52 can be inserted into the cut end of the pipeline 10 and then inflated with an actuator bottle or a pressurizing pump. When the stopper 52 is suitably inflated, the pipeline 10 is sealed. The pipe lifting assemblies 18 and 20 are illustrated as continuing to support the pipeline 10 for a desired distance above the sea floor 12.

The removed damaged section of pipeline 54 is illustrated as residing on the sea floor 12. Once the damaged section of pipeline 54 has been removed, it is simply moved onto the sea floor and offset from longitudinal alignment with the pipeline 10. The pile 22, along with the receptacles 38 and 40, remains in the position illustrated in FIG. 1. The pile 22 is now in a proper position for receiving the replacement length of pipeline.

Figure 3:
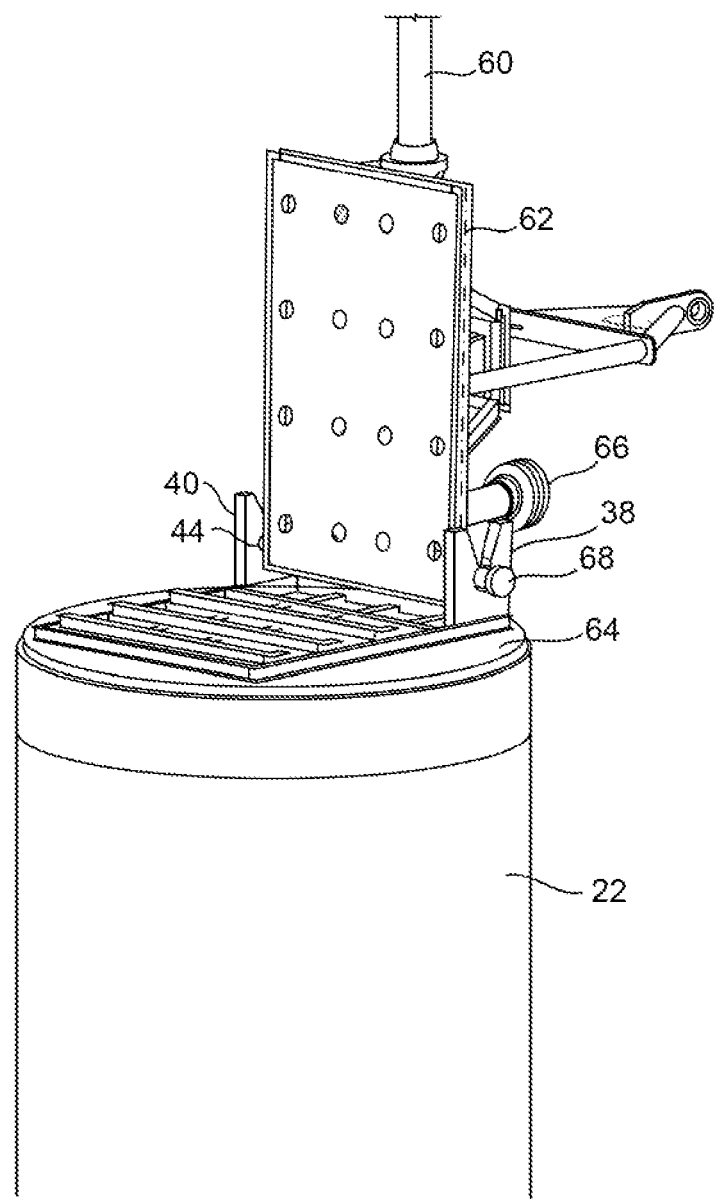
FIG. 3 is an upper perspective view showing the apparatus of the present invention for allowing the pipeline to move from a vertical orientation to a horizontal orientation.

FIG. 3 shows the pile 22 as receiving the replacement length of pipeline 60 therein. In FIG. 3, it can be seen that there is a frame 62 onto which is attached the pipeline 60. The length of pipeline 60 extends vertically upwardly. Similarly, the frame 62 extends vertically upwardly relative to the top surface 64 of the pile 22. There is an end 66 of the pipeline 60 that will extend outwardly of the frame 62.

In FIG. 3, the frame 62 is illustrated as having a pair of pin members 68 extending outwardly therefrom. The pin members 68 are received within the respective holes 44 of the slotted members 38 and 40. This is accomplished by moving the pipeline 60, and its associated frame 62, downwardly from the surface of the body of water. Suitable buoyant containers can be connected to the length of pipeline 60 and the frame 62 so that the weight of the pipeline 60, and its associated frame 62, are somewhat neutrally buoyant within the water. As such, manipulation by an ROV becomes very easy. The ROV can grip the components of the frame 62 so as to move the pin members 68 to a position adjacent to the tapered opening of the slotted members 38 and 40. The frame 62 can be moved downwardly so that the pins 68 are received within the respective holes 44. As such, the frame 62, and its associated length of pipeline 60, are pivotally received within the slotted members 38 and 40 of the pile 22.

Within the concept of the present invention, the length of pipeline 60 can be extremely long. Since the frame 62 has been affixed to the length of pipeline 60 at the surface, no subsea assembly is required. The necessary components for the repair of the subsea pipeline can be provided by simply lowering the extended length of pipeline 60, and its associated frame 62, by conventional methods toward the receptacles 38 and 40 at the top of pile 22.

Figure 4:
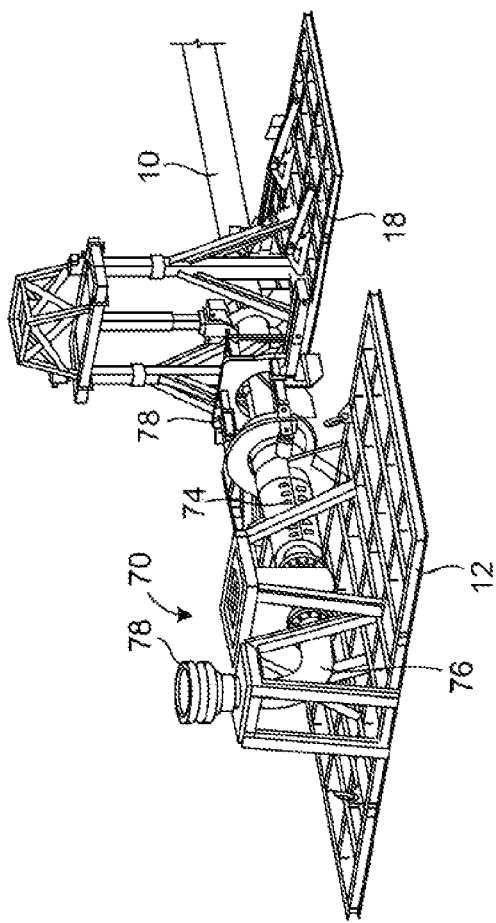
FIG. 4 in is a perspective views showing a further step in the method of the present invention for the repair of the subsea pipeline.
Figure 4:
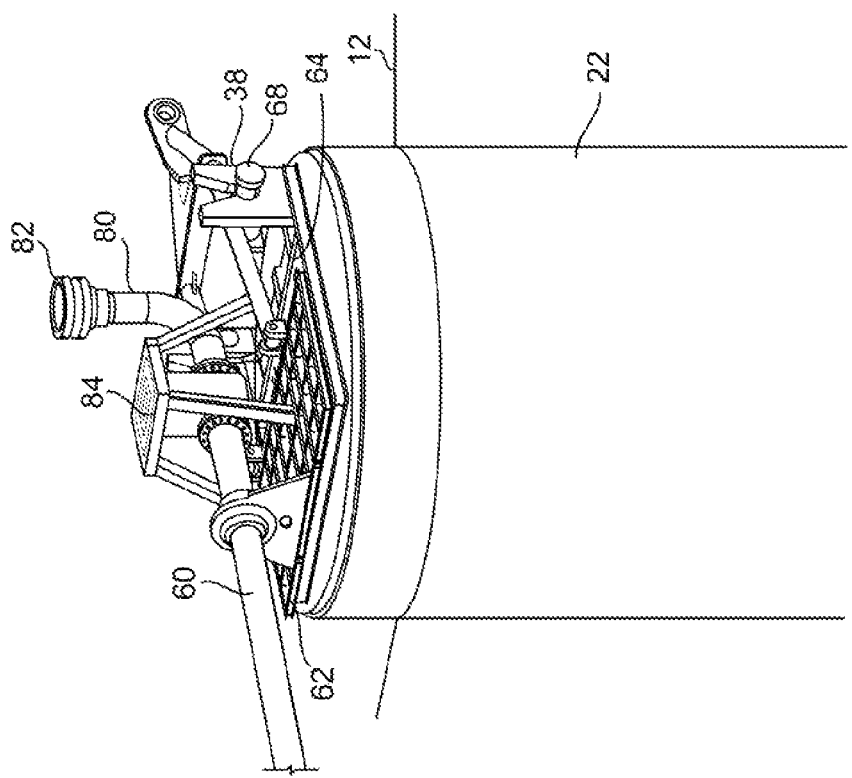
Figure 5:
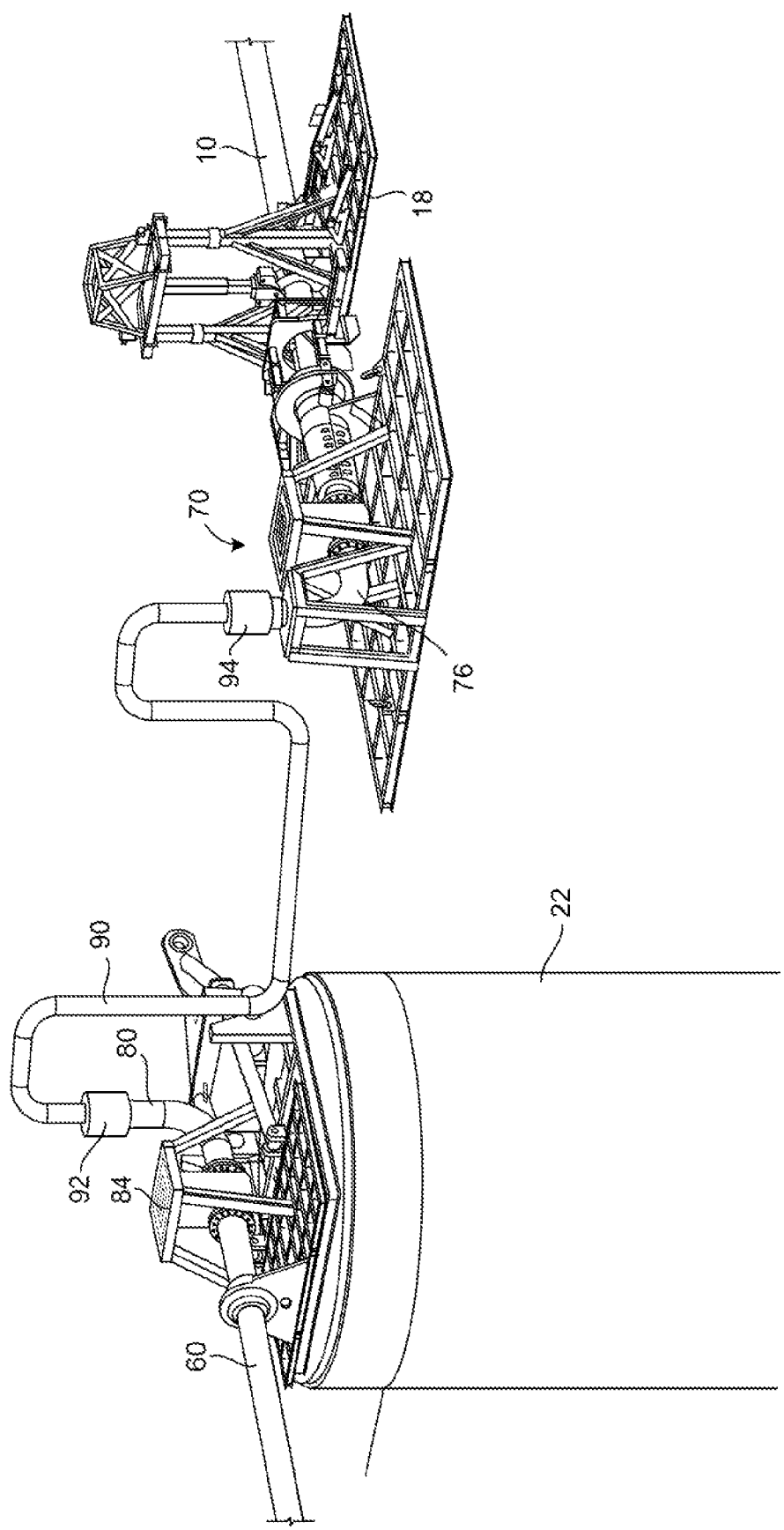
FIG. 5 is a perspective view showing a still further step in the process of the present invention for the repair of a subsea pipeline.

FIG. 4 shows a further step in the connection of the length of pipe line 60 to the subsea pipeline 10. Initially, in FIG. 4, a messenger line assembly 70 has been lowerd so as have a base plate 72 residing on the seafloor 12. The messenger line assembly 70 includes a grip seal connector 74 that is connected to a pipe 76. The pipe lifting assembly 18 continues to support the pipeline 10, and its cut end 50, in an elevated position. As such, the message line assembly 70 can be effectively used so as to secure the grip seal connector 74, and the pipe 76, to the pipeline 10. In particular, a hydraulic yoke 78 is provided on the messenger line assembly 70. The hydraulic yoke 78 is used to so as to urge the grip seal connector 74 over the cut end 50 of the subsea pipeline 10. As such, an effective and permanent connection is established between the pipe 76 and the pipeline 10. The pipe 76 has one end connected to the grip seal connector 74 and an opposite end 78 with a connection hub formed thereon. The opposite end 78 extends vertically upwardly.

In FIG. 4, it can be seen that the length of pipeline 60 is affixed to the frame 62. The length of pipeline 60 has an end portion 80 that extends in transverse relationship to the length of pipeline 60. A connection hub 82 is formed at the end portion 80. The frame 62 has been pivoted about the pin 68 and the slotted member 38 so as to reside in a horizontal orientation generally against the top surface 64 of the pile 22. This pivoting of pipeline 60 with respect to the pile 22 can be simply be achieved by lowering the pipeline through the use of various deployment lines. The end position of the connection hub 82 of the length of pipeline 60 is assured by the precise positioning of the frame 62 with respect to the receptacles 38 and 40. An access valve and port 84 is provided on the pipeline 60. The valve will be closed during installation. The valve can be opened so as to allow a flow passageway to be achieved once the connections are made between the length of pipeline 60 and the subsea pipeline 10.

In FIG. 3, there is shown the installation of a jumper 90 between the subsea pipeline 10 and the length of pipeline 60. In particular, there is a connector 92 located at one end of jumper 90. The connector 92 automatically locks upon the hub 82 of the end portion 80 of the length of pipeline 60. This automatic-locking connector 92 is known in the prior art. Similarly, another connector 94 is located at an opposite end of the jumper 90. This connector 94 is affixed in an automatic-locking manner with the hub 78 associated with the pipe 76 of the messenger line assembly 70. The jumper 90 will have a generally M-shaped configuration. Since the connectors 92 and 94 are only required to descend vertically in order to establish a connection with the respective hubs 82 and 78, installation is relatively easy. It is only necessary to establish measurements between the hubs 82 and 78 in order to know the arrangement and alignment of the connectors 92 and 94. Jumper 90 can be assembled at the surface location. The jumper 90 can then be lowered by suitable deployment lines such that the connectors 92 and 94 properly engage the respective hubs 82 and 78. As such, a secure connection is established between the subsea pipeline 10 an the length of pipeline 60. The nature of the jumper 90 allows the pile 22 to be offset from longitudinal alignment with the subsea pipeline 10. In fact, the pile 22 can be driven into the sea floor to the side of the subsea pipeline 10. A proper connection can be easily achieved even with such an orientation.

Figure 6:
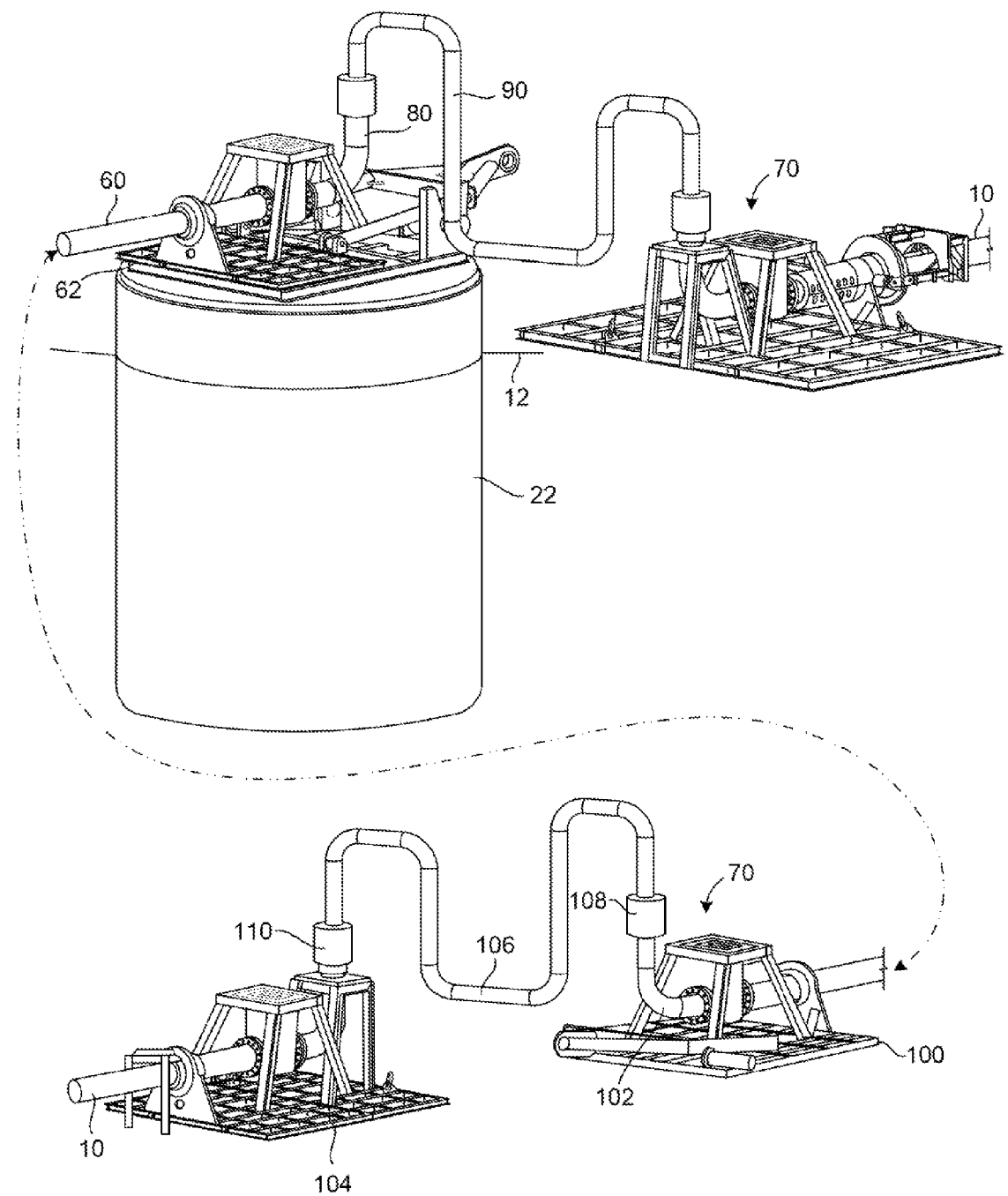
FIG. 6 is an illustration shows the completed repair of the subsea pipeline in which jumpers are connected to the subsea pipeline and connected to the extended length of pipe supported on the top of the pipe support pile.

FIG. 6 shows the final arrangement of the connection of the length of pipeline 60 with the subsea pipeline 10. As was described hereinbefore, the subsea pipeline 10 has been cut so as to have a first cut end and a second cut end. The cut ends are spaced from each other by a desired distance. A first stopper is placed into the first cut end of the pipeline 10. Similarly, a second stopper is placed into the second cut end of the subsea pipeline 10. When the stoppers are installed, then it is possible to properly utilize the respective messenger line assemblies in order to connect the length of pipeline 60 in a desired manner therebetween.

In FIG. 6, the length of pipeline 60 extends in a generally horizontal orientation above the subsea floor 12. The first messenger line assembly 70 is connected to the first cut end of the pipeline 10. The jumper 90 will extend from the messenger line assembly 70 to the upwardly extending end portion 80 of the length of pipeline 60. The frame 62 connected to the length of pipeline 60 is illustrated in its horizontal orientation against the top of the pile 22. The opposite end of the length of pipeline 60 from the pile 22 is connected to a pipe support frame 100. The pipe support frame 100 includes a base plate suitable for supporting the length of pipeline 60 a desired distance above the subsea floor 12. The length of pipeline 60 extends through the pipe support frame 100 so as to have an upwardly extending portion 102.

Similarly, another messenger line assembly 104 is connected to the second cut end of the pipeline 10 in a similar manner that the first messenger line assembly 70 is connected to the first cut end of the pipeline 10. As such, a secure connection can be achieved with the second cut end of the pipeline 10. Another jumper 106 has a first connector 108 at one end that is joined to the upwardly extending portion of the length of pipeline 60 at the pipe support frame 100. Another connector 110 will be affixed to a hub of a pipe that is connected to the second cut end of the pipeline 10. Once again, the use of the jumper 106 allows the length of pipeline 60 to extend with angular variations. The length of pipeline 60 does not need to be longitudinally aligned with the subsea pipeline 10 in order for a secure connection to be achieved.

The present invention utilizes stab and hinge-over methodology. The system utilizes four pipe lift frames 14, 16, 18 and 20 equipped with suitable clamps, guide shoes and mud mats. As such, these pipe lift frames grab and secure the pipe and serve to lift the pipe damaged sections from both sides off the sea floor. An FBE and weld seam removal tool can be used by an ROV to clean the outside diameter of the pipe and then cut the pipe with a chop saw or diamond wire saw at the desired locations. The hydraulic stoppers can be utilized and inserted to the cut ends of the pipeline so as to protect the environment from escaping hydrocarbons. The cut ends of the pipeline 10 are beveled with a pipe end prep beveling tool. This prepares the pipe for installation of the pipeline end termination structure (i.e. the messenger line assemblies). The messenger line assemblies include an upward-facing hub inline with a ROV-operable gate valve and a grip seal connector (with a double-stepped alignment funnel). The messenger line assemblies are lowered by using variable buoyancy tanks. These allow an ROV to effortlessly manipulate the neutrally buoyant messenger line assemblies into position and to install the connector halfway into the prepped pipe without the need to use difficult aligning tools and cameras. The ROV will then actuate a hydraulic yoke to draw the grip seal connector to its final location. The ROV actuates the grip seal connector so as to lock the connector on the pipe. The pipe is then lowered to the subsea floor using the pipe lift frames. This same process is repeated on the other side of the damaged pipeline.

Prior to installing the messenger line assemblies, a messenger line is connected to the hydraulic stopper hoses in order to bleed down the stopper from the pipe.

The first end of the replacement length of pipeline is lowered and aligned with the stab and hinge-over receptacle on the suction pile. A new long length of pipe is installed alongside the damaged, now-severed, pipe section. The first end stabs and hinges over the messenger line assembly. The service vehicle then lays the pipe toward the second end and sets the second end messenger line assembly down to within 100 feet of the previously installed messenger line assembly. Prefabricated jumpers can then be installed between the upwardly facing hubs of the messenger line assemblies at each end in order to complete the repair process. The pipe lift frames can then be retrieved to the surface.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. An apparatus for repairing a subsea pipeline at a subsea floor, the apparatus comprising:
    a pile having a receptacle on a top surface thereof, said receptacle comprising a pair of slotted members extending upwardly from said top surface of said pile, each slotted member of said pair of slotted members having a tapered opening and a hole formed below and communicating with said tapered opening;
    a frame having a pair of pins extending outwardly respectively on opposite sides of said frame, said pair of pins respectively pivotally received in the holes of the slotted members such that said frame can freely rotate with respect to said top surface of said pile;
    a length of pipeline affixed to said frame, said length of pipeline having an end extending in transverse relationship to a remainder of said length of pipeline, said end of said length of pipeline facing away from said frame, said length of pipeline having a first portion affixed to said frame and a second portion extending away from said frame; and
    a pipe support frame affixed to said second portion of said length of pipeline, said pipe support frame having a bottom plate suitable for supporting said second portion a desired distance above the subsea floor.

2. The apparatus of claim 1, said frame being movable between a horizontal position and a vertical position.

3. The apparatus of claim 2, said first portion extending vertically upwardly when said frame is in said horizontal position, said length of pipeline extending horizontally from said first portion when said frame is in said horizontal position.

4. The apparatus of claim 3, further comprising:
    a jumper having one end affixed to said first portion of said length of pipeline and extending outwardly therefrom, said jumper having another end suitable for connection to the subsea pipeline.

5. The apparatus of claim 2, said length of pipeline extending vertically upwardly of said pile when said frame is in said vertical position.

6. The apparatus of claim 2, said second portion extending vertically upwardly when said frame is in said horizontal position.

7. The apparatus of claim 2, further comprising:
    a jumper affixed to said second portion and extending therefrom, said jumper suitable for connection to the subsea pipeline.

* * * * *